Figure 1:
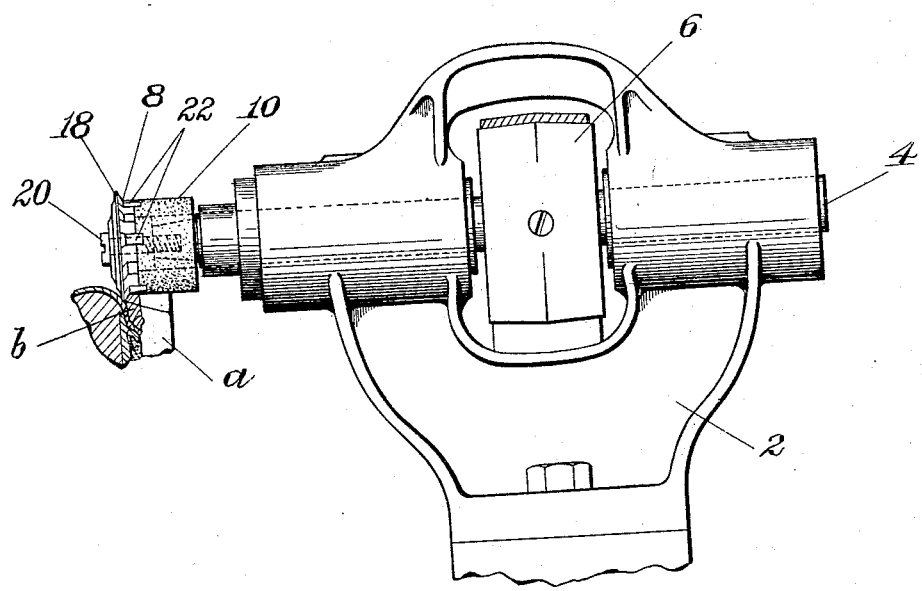

L. H. CONNOR.
EDGE TRIMMING MACHINE.
APPLICATION FILED DEC. 4, 1914.

1,199,051.

Patented Sept. 26, 1916.

WITNESSES.
Elizabeth C. Coufe
O. Blanche Hargraves

INVENTOR.
Lewis H. Connor
By his Attorney,
Nelson M. Howard

UNITED STATES PATENT OFFICE.

LEWIS H. CONNOR, OF BOSTON, MASSACHUSETTS, ASSIGNOR TO UNITED SHOE MACHINERY COMPANY, OF PATERSON, NEW JERSEY, A CORPORATION OF NEW JERSEY.

EDGE-TRIMMING MACHINE.

1,199,051.

Specification of Letters Patent.

Patented Sept. 26, 1916.

Application filed December 4, 1914. Serial No. 875,467.

*To all whom it may concern:*

Be it known that I, LEWIS H. CONNOR, a citizen of the United States, residing at Boston, in the county of Suffolk and State of Massachusetts, have invented certain Improvements in Edge-Trimming Machines, of which the following description, in connection with the accompanying drawings, is a specification, like reference characters on the drawings indicating like parts in the several figures.

This invention relates to edge trimming machines, and particularly to machines for shaping the edges of soles in the manufacture of boots and shoes.

In the manufacture of leather soled shoes it is the usual practice, after the sole has been attached to the shoe, to trim the edge of the sole, including, in the case of a welt shoe, also the edge of the welt, by means of a metallic toothed cutter rotated at a high rate of speed. Many welt shoes at the present time, however, are provided with soles formed of material different from that of the leather welt, such for example as rubber or compositions having many of the characteristics of rubber; and shoes of other types also, as frequently made, present at the edge of the sole a lower layer of rubber or the like and an upper layer of leather comprising, for example, a mock welt or a tap sole to which the rubber sole portion is secured. For trimming soles having such characteristics a metallic cutter is found to be unsatisfactory since, although suitable for trimming the edge of the leather portion, it is ineffective upon the rubber or like material. It has been proposed to use for the purpose an abrading device such as an emery wheel, since it is well known that rubber may be readily shaped by such means; but such a device also, when applied to soles of the character above described, has been found unsatisfactory, since it tends to burn the welt or like leather portion at the sole edge.

It is the object of this invention to provide means for trimming or shaping the edges of soles of the general character above referred to which shall be free from the difficulties encountered in the use of devices heretofore employed or proposed for the purpose, and shall trim all portions of the sole edge effectively without injury to the materials.

The features of the invention, including certain details of construction and combinations of parts, will now be described with reference to the accompanying drawings and pointed out in the claims.

Figure 2:
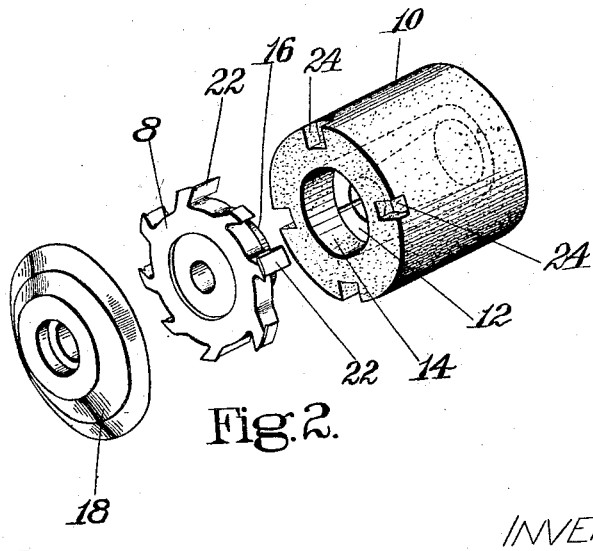

In the drawings, Figure 1 is a view in front elevation of the head of an edge trimming machine in which the preferred form of the invention is embodied, and Fig. 2 shows the parts of the edge trimming tool in disassembled relation.

The portion of the machine shown in Fig. 1 comprises a frame 2 provided with bearings for a shaft 4 which is driven by a belt on the pulley 6. Upon the end of the shaft 4 is mounted the edge trimming tool, which is shown in Fig. 1 in operative relation to the edge of a welt shoe sole comprising a sole proper, *a*, of rubber or like material secured to a leather welt *b*. This tool comprises a metallic toothed cutter 8 similar in form to the cutters in common use for trimming and randing the edges of leather soles and of suitable width for trimming the edge of the leather welt, and an abrading device 10 of emery or like material abutting the end of the cutter 8 and concentric therewith, and having a diameter equal to the effective diameter of the cutter 8 so as to operate upon the material *a* simultaneously with the trimming of the welt *b* and conform it to the edge of the welt. The emery wheel 10 has a bushing 12 provided with a tapering bore which fits upon a tapered portion of the shaft 4, and receives in a recess 14 at the end of the bushing a hub portion 16 of the cutter 8 so as to center the wheel accurately with reference to the cutter. The members 8 and 10, together with the usual upper guard or rand guide 18 which positions the shoe in proper relation to the trimming means, are secured in assembled relation upon the shaft 4 by a screw 20.

As previously explained, a metallic cutter, although relatively ineffective upon material such as rubber, is not positively injurious to such material, while an emery wheel is likely to work a positive injury to material such as leather. It is important therefore that the cutter 8 shall be of such width and that the guide 18 shall be so positioned with reference to the member 10 as to prevent this member from operating upon the welt *b* when the shoe is presented for treatment, but there is no necessity to confine the field of operation of the cutter 8 absolutely to the welt. The latter consideration permits the members 8 and 10 of the tool to be so constructed and related as to trim smoothly and uniformly across the entire edge of the work without any tendency to leave a ridge between the portions which are operated upon respectively by the different members. This result is obtained by providing the cutter and the emery wheel at their adjacent ends with mutually overlapping working portions, and preferably, as in the construction shown, by extending some of the teeth of the cutter 8 into the field of operation of the emery wheel 10. It is found to be unnecessary for the best results that all the teeth of the cutter be thus extended, and therefore in the preferred form shown only every alternate tooth 22 is elongated laterally to enter a recess 24 formed in the end of the emery wheel. In practice there may be considerable variation in the relative number of teeth that are thus extended into the field of operation of the emery wheel, depending principally upon how closely the teeth are set and upon the speed of operation of the device. The cutting edges of the teeth 22, it will be understood, are substantially flush with the peripheral surface of the wheel 10, as are also the edges of the alternating shorter teeth, and are relatively ineffective upon that portion of the work which is engaged by the wheel, but the arrangement serves to break joints between the two portions of the tool and thus to insure that the work shall be acted upon uniformly across its entire width.

The operation of the machine will be readily understood from the preceding description. The shoe is positioned in the usual way with the guard 18 in the rand crease, and is turned to bring into the field of operation of the rapidly rotating tool all portions of the edge to be trimmed.

Although the drawings show the machine in operation upon a welt shoe and the invention has been described with particular reference to such use, it should be understood that the invention is not thus restricted in its application and that the improved machine is likewise adapted and intended for treatment of shoes of other types presenting the general characteristics hereinbefore referred to.

Having described the invention, what I claim as new and desire to secure by Letters Patent of the United States is:—

1. In a machine of the class described, the combination with a driving shaft, of a metallic toothed cutter mounted on the shaft, and an abrading tool mounted on the shaft adjacent to the end of the cutter in position to operate upon one portion of the work simultaneously with the operation of the cutter upon another portion thereof, said cutter having cutting edges substantially flush with the active surface of the abrading tool.

2. In a machine of the class described, the combination with a driving shaft, of a metallic toothed cutter mounted on the shaft and of suitable width to trim the welt at the edge of the sole of a shoe, and an abrading device also mounted on the shaft and having a diameter substantially equal to the effective diameter of the cutter, said device being mounted adjacent to the end of the cutter in position to operate simultaneously upon a portion of the sole of different material from that of the welt.

3. In a machine for trimming the edges of soles comprising a layer of leather and a layer of rubber or the like, the combination with a driving shaft, of a metallic toothed cutter mounted on the shaft, an abrading tool adjacent to the end of the cutter, said cutter and tool being constructed and arranged to trim the respective adjacent portions of the edge of the sole in substantially perpendicular relation to the plane of the sole, and means for positioning the work for the simultaneous operation thereon of said cutter and abrading tool, said means being so arranged with reference to the abrading tool as to confine the operation of said tool to the rubber portion of the sole.

4. In a machine for trimming the edges of soles comprising a layer of leather and a layer of rubber or the like, the combination with a driving shaft, of a metallic toothed cutter mounted on the shaft, an abrading tool mounted on the shaft adjacent to one end of the cutter, said cutter and tool having mutually overlapping working portions at their adjacent ends, and shoe positioning means so arranged with reference to the abrading tool as to confine the operation of said tool to the rubber portion of the sole.

5. In a machine of the class described, a rotary toothed cutter and an emery wheel concentric with the cutter and adjacent to the end thereof, said cutter including teeth extending within the field of operation of the emery wheel.

6. In a machine of the class described, a rotary toothed cutter and an emery wheel of substantially the same effective diameter as the cutter and concentric therewith, said emery wheel being formed with recesses in the end thereof adjacent to the cutter, and the cutter having teeth extended within said recesses.

7. In a machine for trimming the edges of soles which comprise layers of different materials, a trimming tool comprising a cutting member for operating upon one portion of the sole and an abrading member for operating simultaneously upon another portion of the sole, said members being constructed and arranged to trim the respective portions of the sole to substantially the same plane.

8. In a machine of the class described, a rotary toothed cutter, and an abrading device at one end of the cutter in position to operate upon one portion of the work simultaneously with the operation of the cutter upon another portion of the work, said device being constructed and arranged to trim the work to substantially the same plane as the adjacent cutting edges of the cutter.

9. In a machine of the class described, a rotary toothed cutter, and an abrading device at one end of the cutter in position to operate upon one portion of the work simultaneously with the operation of the cutter upon another portion of the work, said cutter including teeth extending within the field of operation of the abrading device and provided with cutting edges substantially flush with the abrading surface of said device to insure uniformity in the finished surface of the work.

In testimony whereof I have signed my name to this specification in the presence of two subscribing witnesses.

LEWIS H. CONNOR.

Witnesses:
HOWARD O. WINSLOW,
WILLIAM B. KING.

Copies of this patent may be obtained for five cents each, by addressing the "Commissioner of Patents, Washington, D. C."